United States Patent Office 3,435,483
Patented Apr. 1, 1969

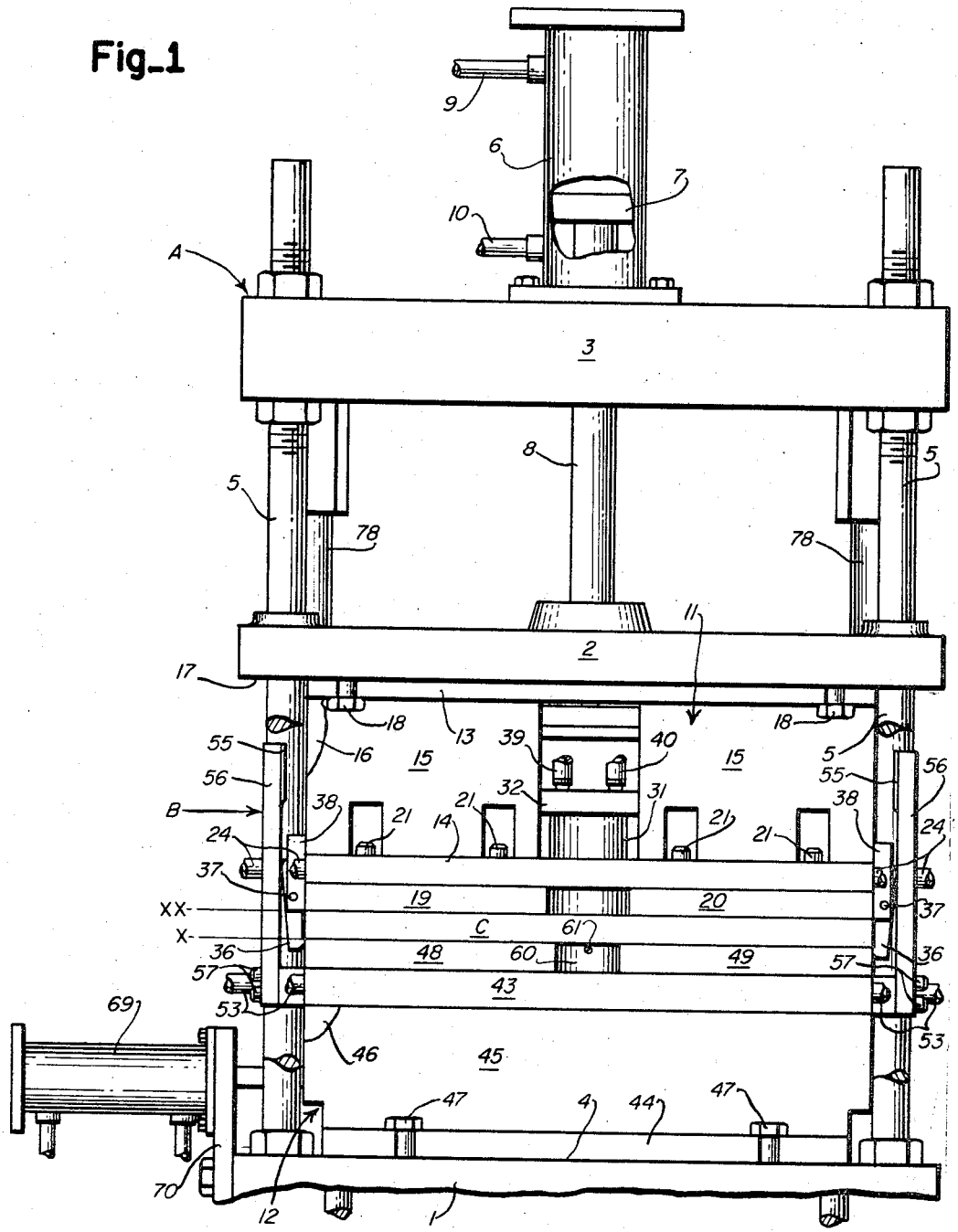

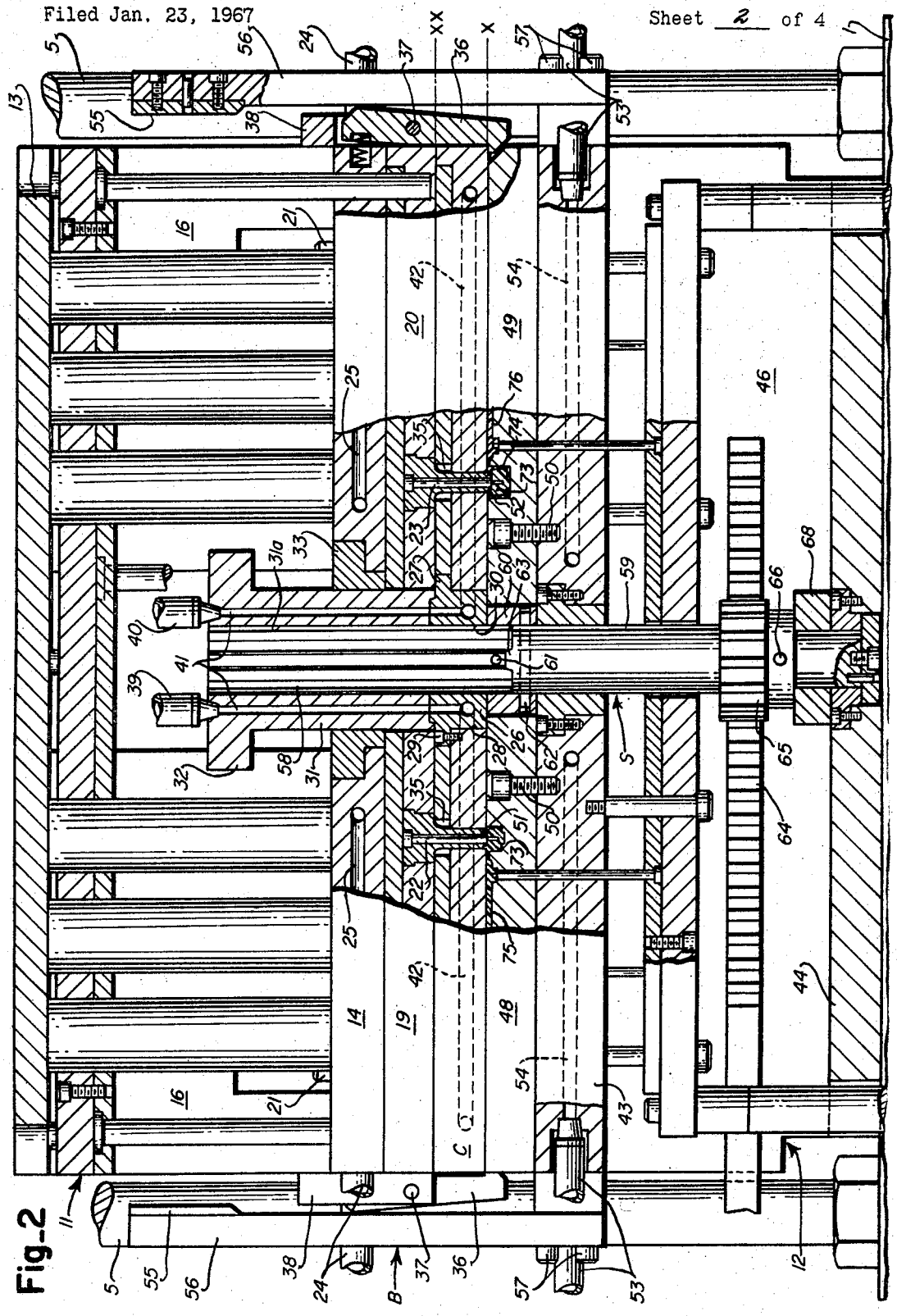

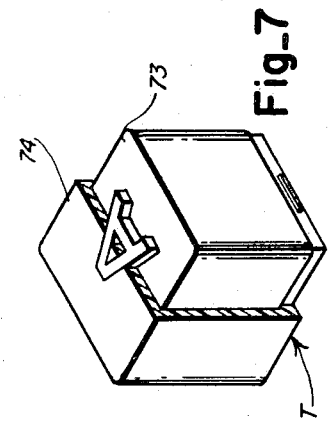
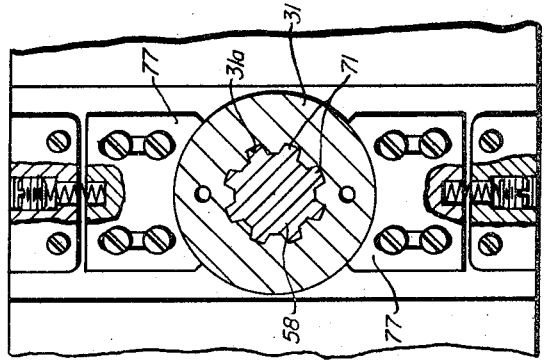
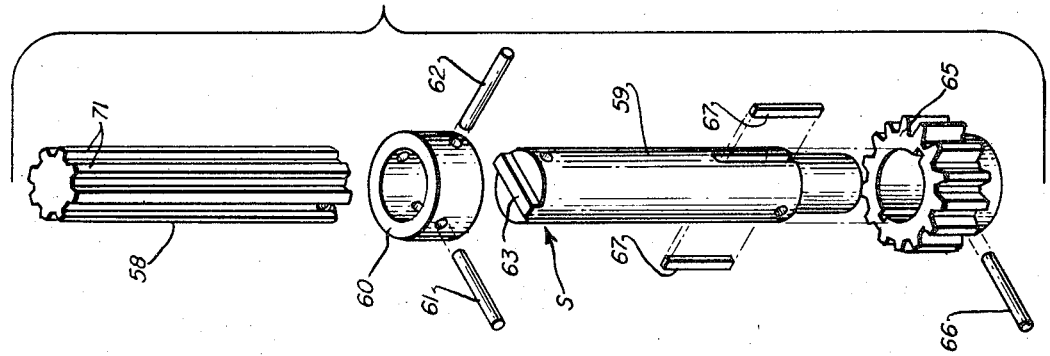
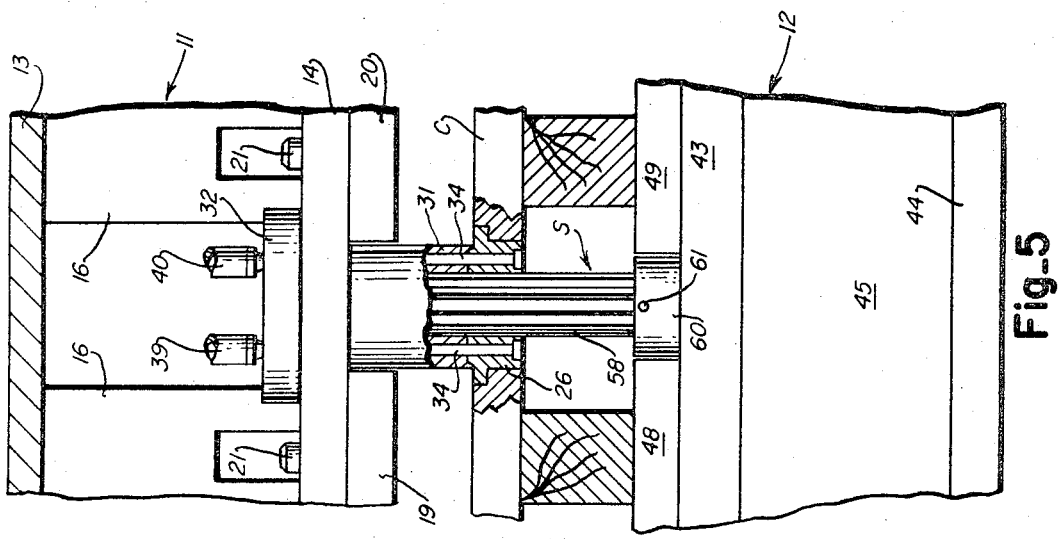

3,435,483
MOLD STRUCTURE FOR USE WITH DOUBLE
INJECTION MOLDING MACHINES
Edward A. Heiner, Rocky Hill, and John D. Flannery,
Granby, Conn., assignors to Litton Business Systems,
Inc., a corporation of New York
Filed Jan. 23, 1967, Ser. No. 611,135
Int. Cl. B29g 3/00
U.S. Cl. 18—42                4 Claims

ABSTRACT OF THE DISCLOSURE

A double injection mold structure for simultaneously molding a plurality of different keytops or buttons of the type used on business machines or the like, the mold structure characterized by a split drive shaft which permits quick and convenient removal and replacement of the core pin plates, cavity plates, and one-piece transfer plate of the mold structure without requiring the mold structure to be removed from the press section of the molding machine, disassembled, reassembled and then remounted in said machine.

---

The present invention relates to certain new and useful improvements in two-color double injection molding machines; more particularly it relates to an improved mold structure for use with such machines; and specifically it relates to a mold structure characterized by a split drive shaft for rotating the conventional one-piece transfer or index plate section of said mold structure.

Conventional mold structures heretofore used with two-color double injection molding machines comprise three basic units, namely, a top unit removably connected to the usual vertically reciprocated platen of the molding machine and to which top unit a pair of horizontally aligned core pin plates are removably attached; a bottom unit that is removably mounted upon the base of said machine and to which bottom unit a pair of horizontally aligned cavity plates are removably attached; and a one-piece transfer plate which is slidably carried by said top unit and arranged for vertical and rotative movements relative to said core pin and cavity plates.

One important disadvantage of the above described conventional mold structure is that when it becomes desirable to mold keytops or other parts of different shapes or sizes, requiring different or altered core pin, cavity and transfer plates, the one-piece drive shaft passing through the one-piece transfer plate presents two alternates, both of which are costly and time consuming as the mold structure is associated with water cooling lines, hydraulics for operating the transfer plate drive shaft and eject pins, and mechanisms for opening and closing the core pin, transfer and cavity plates relative to one another.

For example, in order to mold differently shaped parts the user of conventional mold structures having a one-piece drive shaft for rotating the one-piece transfer plate can either remove the entire original mold structure from the press section of the molding machine and replace it with another mold structure provided with core pins, cavity, and transfer plates made according to the different parts to be molded, or, after removing the original mold structure from the press section of the machine he can disassemble it, alter the original core pin, cavity and transfer plates or replace them with other plates, reassemble the original mold structure, and then reinstall it within the press section of the molding machine.

Removal of the entire mold structure from the press section of the molding machine is a very costly operation in that it takes approximately two and one half days of labor and downtime for the machine and necessitates the disconnection of all water cooling lines to the mold structure; disconnection and removal of the hydraulics and drive for the one-piece transfer plate drive shaft; removal of the cam operated latches and their cams for the transfer plate; disconnection and removal of the hydraulics and drive for the eject pins which are partially housed within the bottom unit of the mold structure; disconnection of the plastic ejection nozzles from the cavity plate; and unbolting the top unit from the movable platen, and the bottom unit from the machine base before safety straps can be applied to retain the mold structure in closed position and then lifted from the press section of the molding machine by a life fork, chain hoist or equivalent lifting means.

Moreover, frequent disassembly and reassembly of any precision piece of equipment, such as these mold structures, is very poor practice because in a very short time the built-in accuracy of the mold structure will be destroyed.

Accordingly, it is among the objects of the present invention to provide an improved mold structure for two-color injection molding machines that overcomes the above mentioned disadvantages in a thoroughly practical and efficient manner, and which facilitates changing or replacing the core pin, cavity and one-piece transfer plates of the mold structure without the necessity for disassembling and reassembling the entire mold structure or replacing it by a completely new mold structure as has been the practice in the past.

Other objects of the invention are to reduce the labor costs and downtime of the molding machine when the dimensional characteristics of the parts to be molded necessitate a change in the core pin, cavity and one-piece transfer plates of a mold structure.

For the attainment of these and such other objects as may hereinafter appear or be pointed out, we have shown one embodiment of our invention in the accompanying drawings, wherein:

FIGURE 1 is a partial front elevational view of a two-color injection molding machine having a mold structure made in accordance with the present invention and mounted within the press section of said molding machine;

FIGURE 2 is an enlarged front elevation of the mold structure partly in vertical section including portions of the molding machine;

FIGURE 5 is an enlarged fragmentary front elevational view of the mold structure in open position, and partly in section showing the transfer plate resting upon block so that it can be disconnected from its sleeve;

FIGURE 6 is an exploded perspective view of the two-part drive shaft for the one-piece transfer plate and its driving pinion;

FIGURE 7 is an enlarged perspective view partly in section of a two-part two-color keytop molded by the mold structure; and FIGURE 8 is a fragmentary top view of the friction shoes which cooperate with the transfer plate sleeve.

Figure 4:
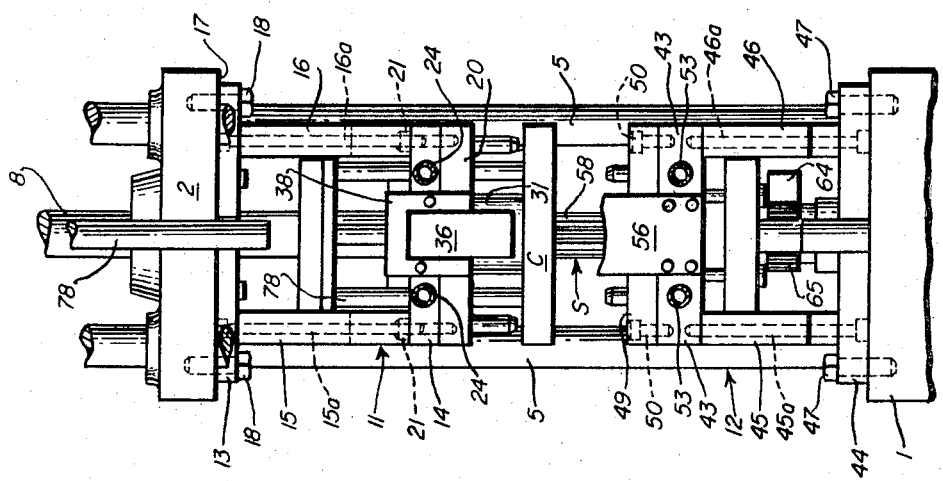
FIGURES 3 and 4 are front and side elevational views respectively of the frame members for the top movable unit and bottom stationary unit of the mold structure including portions of the molding machine.

Referring now to the drawings in detail wherein like reference characters designate like or corresponding parts throughout the several views there is shown in FIGURE 1 a conventional two-color double injection molding machine generally designated A and mounted in the press section of the molding machine is a mold structure made in accordance with the present invention and generally designated B.

With particular reference to FIGURE 1 the molding machine A comprises the usual base 1, movable platen 2 and crosshead 3. Extending upwardly from the top surface 4 of base 1 are four posts or columns 5, the upper ends of which adjustably support the crosshead 3. Platen 2 is mounted for vertical sliding movement upon said posts 5 and is reciprocated vertically relative to base 1 and crosshead 3 by the conventional hydraulics which include a cylinder 6 mounted upon crosshead 3, piston 7 and piston rod 8. The lower end of piston rod 8 is connected to platen 2 and its upper end is connected to the piston 7 within cylinder 6. Thus when fluid under pressure is admitted to the top of cylinder 6 through hose or pipe 9 above the piston, said piston 7 and piston rod 8 will move the platen 2 downwardly upon posts 5 toward base 1 and conversely, when fluid under pressure is admitted to the bottom of cylinder 6 through hose or pipe 10 below the piston 7, said piston and piston rod 8 will move the platen 2 upwardly upon posts 5 toward the crosshead 3. The mechanism briefly described above is old and well known in the art.

Figure 3:
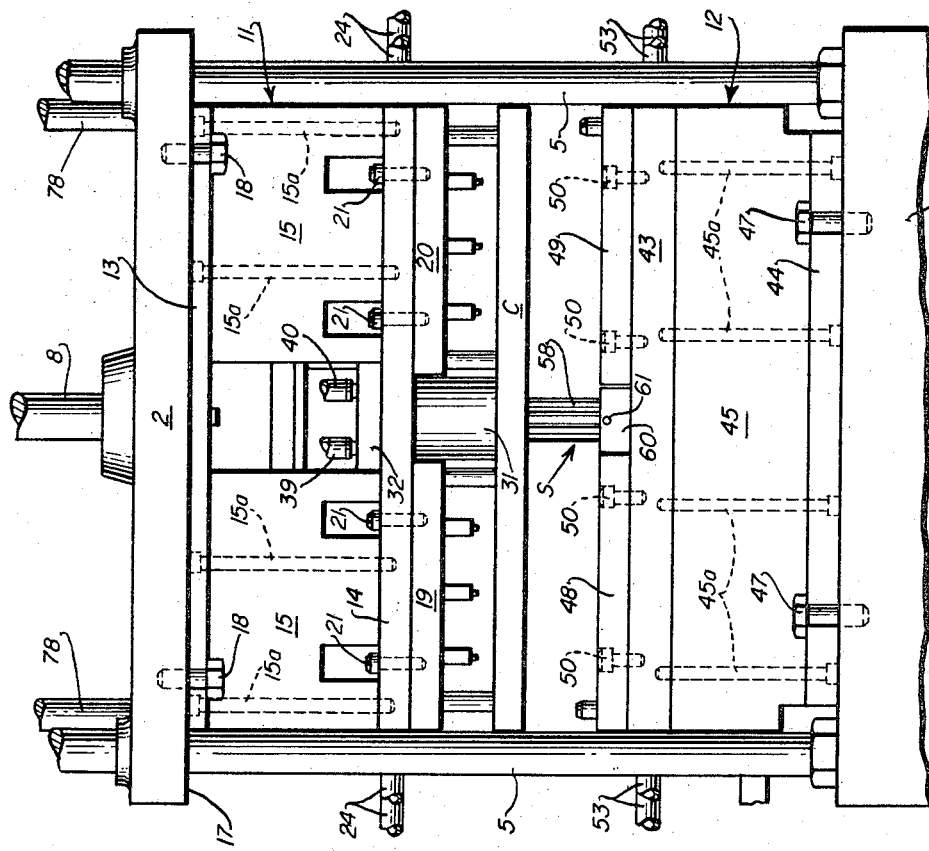

The press section of the molding machine A above mentioned is defined by the space between the movable platen 2 and top surface 4 of base 1 and between the posts 5. The mold structure B mounted within the press section will now be described with particular reference to FIGURES 1 and 2. As shown in FIGURE 1 mold structure B comprises three basic units, namely a top unit 11, bottom unit 12 and a one-piece transfer plate unit designated C disposed for vertical and rotative movement relative to said top and bottom units. The top unit 11 will be described first with particular reference to FIGURE 2. As here shown top unit 11 comprises the usual framework consisting of a horizontal top plate 13 which is spaced vertically above a horizontal bottom plate 14 by vertically disposed front and rear plates 15 and 16 respectively, and the plates are held together by bolts 15a and 16a as shown in FIGURE 3. Top plate 13 of unit 11 is removably attached to the bottom surface 17 of platen 2 by bolts 18 and thus unit 11 moves vertically with said platen. Also forming part of the movable top unit 11 are a pair of horizontally aligned core pin plates 19 and 20 which are removably attached to the bottom surface of frame plate 14 by bolts 21, and the plates 19–20 have the usual core pins 22 and 23 respectively. To maintain the proper molding temperature for the core pin plates 19–20 and their core pins 22–23 respectively, frame plate 14 is connected with the usual water lines 24 which supply water for circulation through the usual water channels 25 formed in said plate 14.

Referring now to the transfer plate C and to FIGURE 2, it will be observed that this plate extends from the extreme left end of core pin plate 19 to the extreme right end of core pin plate 20 and is of one-piece construction. A collar 26 having a flange 27 is removably mounted in a centrally disposed hole 28 in plate C and said flange is connected to said plate by bolts 29. Collar 26 is further provided with a central bore the vertical wall of which is provided with a plurality of radially projecting and axially extending grooves 30 which are in axial alignment with a like number of radially projecting and axially extending grooves 31a formed in the wall of a central bore in a sleeve 31 for reasons presently described. Sleeve 31 has a flange 32 formed integral with its upper end and the sleeve is mounted for rotative and vertical sliding movement within a bushing 33 mounted in the frame plate 14 during opening and closing of the mold structure in a manner and for reasons presently made clear. It will be observed from FIGURE 5 that the bottom surface of sleeve 31 is connected to the top surface of collar 26 by bolts 34. Thus transfer plate C, its collar 26 and sleeve 31 are removably connected to one another to move as a unit and the sleeve is permitted to slide downwardly within the bushing 33 in frame plate 14 until its flange 32 comes into contact with the top surface of said frame plate as illustrated in FIGURE 3. Transfer plate C is further provided with a plurality of holes 35 (see FIGURE 2) to permit the core pins 22–23 to pass through said transfer plate C when the top surface of said plate is in engagement with the bottom surface of said core pin plates 19–20. Plate C is normally held in engagement with the core pin plates 19–20 by a pair of oppositely disposed spring pressed latches 36 which are pivotally mounted on pins 37 carried by brackets 38, the brackets being mounted upon frame plate 14. To further maintain proper molding temperatures for the core pins 22–23 respectively, sleeve 31 is connected to the conventional water lines 39 and 40 which supply water for circulation through water channels 41 in said sleeve and water channels 42 in said transfer plate C.

Attention is now directed to FIGURES 1 and 2 for a detailed description of the bottom stationary unit 12 of mold structure B. As shown in FIGURE 1, unit 12 comprises the usual frame work composed of a horizontal top plate 43 which is spaced above a horizontal bottom plate 44 by vertically disposed front and rear frame plates 45 and 46 respectively, and the plates are held together by bolts 45a and 46a as shown in FIGURE 3. Bottom frame plate 44 is removably attached to the top surface 4 of base 1 by bolts 47. A pair of horizontally aligned cavity plates 48–49 are removably connected to the top surface of frame plate 43 by bolts 50, and the cavity plates 48–49 have cavities 51–52 respectively. To maintain the proper molding temperature for the cavity plates 48–49 and their cavities 51–52 respectively, the top frame plate 43 is connected to the usual water lines 53 which supply water for circulation through channels 54 formed in said top frame plate 43. Also considered as part of the lower stationary unit 12, of mold B, are a pair of cams 55 which cooperate with the transfer plate latches 36 previously referred to in connection with the movable top unit 11. The cams 55 are bolted to the upper ends of arms 56 and the lower end of said arms are removably attached to frame plate 43 by bolts 57.

It has been previously mentioned that the one-piece transfer plate C has heretofore been rotated by a one-piece drive shaft and the disadvantages caused by said shaft extending upwardly through and beyond said one-piece transfer plate when it becomes necessary to change or alter said plate C, and/or the core pin and cavity plates.

According to the present invention, the improved mold structure B is provided with a split or two part shaft S for rotating the one-piece transfer plate C and, as clearly shown in FIGURES 2 and 6 this split shaft comprises an upper shaft 58 and a lower shaft 59. The upper end of the lower shaft 59 is removably connected to the lower end of the upper shaft 58 by a collar 60 and pins 61 and 62 respectively. Pin 61 extends through collar 60 and through the lower end of upper shaft 58 whereas pin 62 extends through said collar 60 and through the upper end of lower shaft 59, the pins being disposed at a right angle relative to one another as best shown in FIGURE 6. To further strengthen the two-part shaft S a key and keyway 63 is formed on the meeting ends of said upper and lower shafts 58–59 respectively.

It is of extreme importance that the transfer plate C be maintained perfectly level at all times and especially during the time it is separated from the core pin and cavity plates as shown in FIGURE 3 to insure proper registry of the core pins with their corresponding openings in said transfer plate when the mold structure is being opened and closed. The above described removable connection for the split drive shaft S is such that the drive from the lower shaft 59 to the upper shaft 58 is equally distributed through the pins 61–62, collar 60 and the key and keyway 63.

Rotary motion is imparted to the split drive shaft S by the conventional rack 64 and pinion 65, the pinion being connected to the lower shaft 59 by a pin 66 and keys and keyways 67. As shown in FIGURE 2 the lower end of lower shaft 59 is rotatably journalled in a bushing 68 which is mounted within bottom frame plate 44. One end of rack 64 is in mesh with pinion 65 and its other end is connected to, and reciprocated by, the usual hydraulically operated piston within cylinder 69 (FIGURE 1) and said cylinder is removably carried by a bracket 70 bolted to base 1.

The outer periphery of upper shaft 58 is formed with the usual axially extending and radially projecting splines or teeth 71 and these teeth slidably fit within the vertically aligned grooves 31a and 30 formed in sleeve 31 and collar 26 respectively. It will now be understood that whenever the split shaft S is rotated by the rack 64 and pinion 65, sleeve 31, collar 26 and transfer plate C will also be rotated, and that said sleeve, collar and plate are free to slide axially upon said upper shaft 58 during opening and closing of the mold structure B durnig a molding cycle of the machine in a manner and for reasons now described.

*Molding cycle*

To describe a typical molding cycle for the molding machine A it will be assumed that the mold structure B has been mounted in the press section of the machine and connected to the water lines, hydraulics, etc., above described; that the core pin plates 19–20, cavity plates 48–49 and one-piece transfer plate C have been designed to mold two-part two-color keytops for business machines and the like; that the conventional plastic injection nozzles (not shown) have been connected to said cavity plates; and that the mold structure B is in its closed position which is the position illustrated in FIGURE 2. In this closed position of the mold structure B the core pins 22 of core pin plate 19 have passed downwardly through openings 35 in transfer plate C and their lower exposed ends are positioned within the cavities 51 of cavity plate 48 and the core pins 23 of core pin plate 20 have similarly passed downwardly through their corresponding openings 35 in said transfer plate with their lower exposed ends positioned within the cavities 52 of cavity plate 49. The first color plastic, for example, black, is now injected into the cavities 51 and around the ends of core pins 22 to form the first or inner half 73 of the two part keytops T being molded as shown in FIGURES 2 and 7. Simultaneously therewith another color plastic, for example, white, is injected into the cavities 52 and around the black parts 73, previously deposited therein by rotation of the transfer plate C, to form the outer half 74 of said two part keytops T. The mold structure is now opened at the first parting line X, that is, between the lower surface of transfer plate C and the top surfaces of the cavity plates 48–49. This is effected by hydraulically raising the platen 2 which carries the top unit 11 and transfer plate C upwardly to the position shown in FIGURE 3. This upward movement of unit 11 and transfer plate C strips the black parts 73 from their runners 75 and the white parts 74 from their runners 76.

Platen 2 is then raised further to open the mold structure B at the second parting line XX, or between the lower surface of core pin plates 19–20 and upper surface of transfer plate C. This additional upward movement of platen 2 engages the latches 36 with the cams 55 thereby withdrawing the latches from holding engagement with the bottom surface of the transfer plate C which is now held by the friction shoes 77 which are spring pressed into contact with the outer periphery of sleeve 31 as best shown in FIGURE 8. As the platen 2, unit 11 and plate C continue to rise the conventional bumper rods 78 (see FIGURE 4) are brought into contact with the top surface of plate C to stop any further upward movement of said plate. Friction of the shoes 77 against sleeve 31 is thus overcome allowing the transfer plate to drop downwardly by its own weight until it is stopped by engagement of flange 32 with the top surface of frame plate 14. As the one-piece transfer plate C moves downwardly upon upper shaft 58 and away from unit 11, the core pins 22–23 are withdrawn from the plastic parts 73–74. The black parts 73 are then held by plate C but the finished two part key buttons T are dropped upon a tray and subsequently pushed away from the tray in the usual and well known manner. The transfer plate C is now in condition to be rotated 180° to carry the black parts 73 into vertical alignment with the cavities 52 of cavity plate 49.

Platen 2 is now lowered to first close the mold structure B at the first parting line X and then at the second parting line XX to relatch plate C with unit 11 and to position the core pins 23 and black parts 73 within the cavities 52 of cavity plate 49, and core pins 22 within the now empty cavities 51 of cavity plate 48. The mold structure B is now in condition to start another molding cycle and from the molding above described it will be apparent that every molding cycle of the machine after the first cycle simultaneously forms a plurality of black parts 73 in cavity plate 48 and a plurality of complete two-color key-tops T in cavity plate 49 in the well known manner.

Suppose now that different shaped keytops T or other parts of a different shape and size are to be molded. By the use of the split drive shaft S, for the transfer plate C above described, the core pin, cavity and transfer plate C can now be removed, altered or changed and remounted in the mold structure B in a fraction of the time required when the drive shaft for the transfer plate is made in one piece.

Let it be assumed now that keytops of a different shape or size are to be molded thus requiring a change or alteration of the core pin, transfer and cavity plates.

When the drive shaft for the one-piece transfer plate is made in one piece, as has heretofore been the practice, the following operations or steps are necessary in order to remove, change or alter the core pin, transfer and cavity plates of the mold structure B.

(1) The molding machine A is operated to close the mold structure to the position shown in FIGURE 1.

(2) Safety straps are then installed to hold the mold structure in this closed position.

(3) Disconnect the top unit 11 from platen 2 and bottom unit 12 from base 1 by removing the bolts 18 and 47 respectively.

(4) The molding machine A is again operated to raise platen 2 above top unit 11.

(5) Disconnect all water cooling lines from the transfer plate C and top and bottom units 11 and 12 of the mold structure B.

(6) Disconnect the plastic injection nozzles from the cavity plates 48–49.

(7) Remove the cams 55 and their supporting arms or brackets 56 from the top plate 43 of lower unit 12.

(8) Remove latches 36 and their brackets 38 from plate 14.

(9) Remove the microswitches and sequence switches that control the operation of the hydraulically operated rack 64.

(10) Remove the cylinder 69 and its supporting bracket 70 from base 1.

(11) The entire mold structure B is now in condition to be removed from the press section of the machine by a lift fork, chain hoist or similar lifting equipment.

(12) When mold structure B has been removed from the press section of the machine the safety straps are then removed from mold structure B and unit 11 and transfer plate C can then be lifted from bottom unit 12 by a chain hoist and free of the one-piece drive shaft. Unit 11 may now be inverted to facilitate the removal of bolts 34 to disconnect the transfer plate C from its sleeve 31.

(13) The core pin plates 19–20 and cavity plates 48–49 can now be unbolted from their frame plates 14 and 43 respectively and removed from the units 11 and 12 for alterations or replacement.

(14) All of the above steps are then reversed to reassemble and remount the mold structure B within the press section of the molding machine A and as above pointed out this procedure requires approximately 2½ days' labor and downtime for the molding machine.

As a comparison to the above the following operations or steps are all that is required to remove, change or alter the core pin, transfer and cavity plates of the mold structure B when the drive shaft S for the transfer plate is made from two shafts connected in axial alignment relative to one another.

(1) The machine is operated to open the mold structure B at the first parting line X. This moves unit 11 and the one-piece transfer plate C upwardly above lower unit 12.

(2) The upper shaft 58 of the split or two-part drive shaft can now be disconnected from the lower shaft 59 by merely removing the upper pin 61 from collar 60 and said upper shaft whereupon said disconnected upper shaft 58 can be slid axially upwardly within sleeve 31 and free of transfer place C and clamped in this position.

(3) Blocks of wood are then placed upon the cavity plates 48–49 (as shown in FIGURE 5) and platen 2 is then lowered until the one-piece transfer plate C rests upon the blocks of wood.

(4) Latches 36 can now be wedged to open position and out of holding engagement with plate C.

(5) Bolts 34 are now removed thus disconnecting plate C from sleeve 31.

(6) Platen 2 is then elevated to lift unit 11 and sleeve 31 above plate C and the plate is now free to be removed from the mold structure.

(7) The core pin and cavity plates can now be unbolted and removed from the upper and lower units 11 and 12 for alterations or replacement.

(8) The above procedure is reversed to remount the new or altered core pin, transfer and cavity plates within the mold structure B and as previously stated this procedure requires only 2½ hours of labor and downtime for the molding machine.

The construction and operation of a conventional mold structure has been described in some detail in order to clearly show a comparison of the great savings made possible for labor and downtime of a two-color double injection molding machine when the drive shaft S for the one-piece transfer plate C is made from two shafts removably connected to one another instead of the conventional one-piece drive shaft when it becomes necessary to repair, change or replace the one-piece transfer plate and/or the core pin and cavity plates.

While there is in this application specifically described one form which the invention may assume in practice, it will be understood that this form of the same is shown for purposes of illustration only and that the invention may be modified and embodied in various other forms without departing from its spirit and scope of the appended claims.

What is claimed is:

1. A double injection mold structure of the class described having a stationary bottom unit to which a pair of horizontally aligned cavity plates are removably attached, a movable top unit to which a pair of horizontally aligned core pin plates are removably attached, and a one-piece transfer plate slidably and rotatably carried by said movable top unit and arranged for relative vertical and rotative movement between said cavity and core pin plates, the improvement of means for rotating said one-piece transfer plate comprising:

a lower drive shaft rotatably journalled within said stationary bottom unit;
means for rotating said lower drive shaft;
an upper shaft splined to said one-piece transfer plate to provide for axial sliding movement of said plate upon said shaft; and
detachable means for drivingly connecting said upper and lower shafts in axial alignment whereby upon disconnecting said upper shaft from said lower shaft and removing it from within said one-piece transfer plate, said transfer plate, core pin and cavity plates can be removed from the mold structure without necessitating any further disassembly of said mold structure.

2. In a mold structure as defined by claim 1, wherein the means for detachably connecting said upper and lower shafts in axial alignment relative to one another comprises:

a collar having a central bore to receive the abutting ends of said upper and lower shafts;
a first removable pin acting to connect the lower portion of said collar with the upper end of said lower shaft; and
a second removable pin acting to connect the upper portion of said collar with the lower end of said upper shaft, said first pin being disposed at a right angle relative to said second pin.

3. In a mold structure as defined in claim 1; additionally comprising a key formed upon the abutting end of one of said axially aligned shafts and adapted to fit within a keyway formed in the abutting end of the other of said shafts.

4. In a mold structure as defined in claim 1, wherein the means for slidably and rotatably mounting said one-piece transfer plate within said top unit comprises a sleeve having a central bore provided with axially extending grooves to slidably receive corresponding splines formed on said upper shaft, a flange formed integral with the upper end of said sleeve which serves as a downstop for said transfer plate relative to said top unit, and means removably connecting the lower end of said sleeve with said transfer plate.

References Cited
UNITED STATES PATENTS

| | | |
|---|---|---|
| 2,226,408 | 12/1940 | Nost. |
| 2,333,059 | 10/1943 | Tucker. |
| 2,558,027 | 6/1951 | Wilson. |
| 2,714,949 | 8/1955 | Morin. |
| 3,031,722 | 5/1962 | Gits. |
| 3,259,356 | 7/1966 | Hehl. |
| 3,319,300 | 5/1967 | Hehl. |
| 3,345,684 | 10/1967 | Scherrer-Wirz. |
| 3,173,176 | 3/1965 | Kobayashi. |

J. HOWARD FLIT, JR., *Primary Examiner.*

U.S. Cl. X.R.

18—30, 36